UNITED STATES PATENT OFFICE.

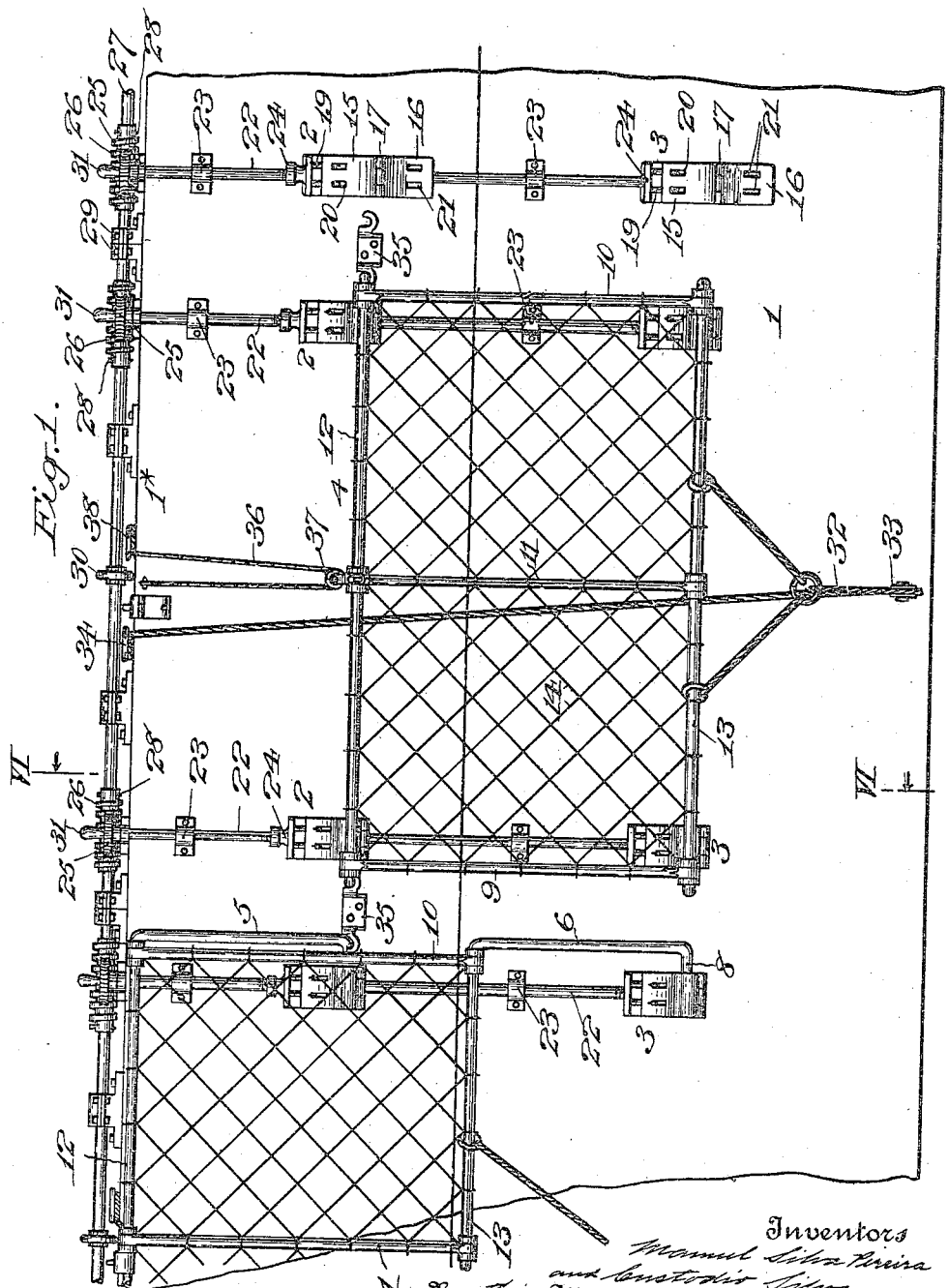

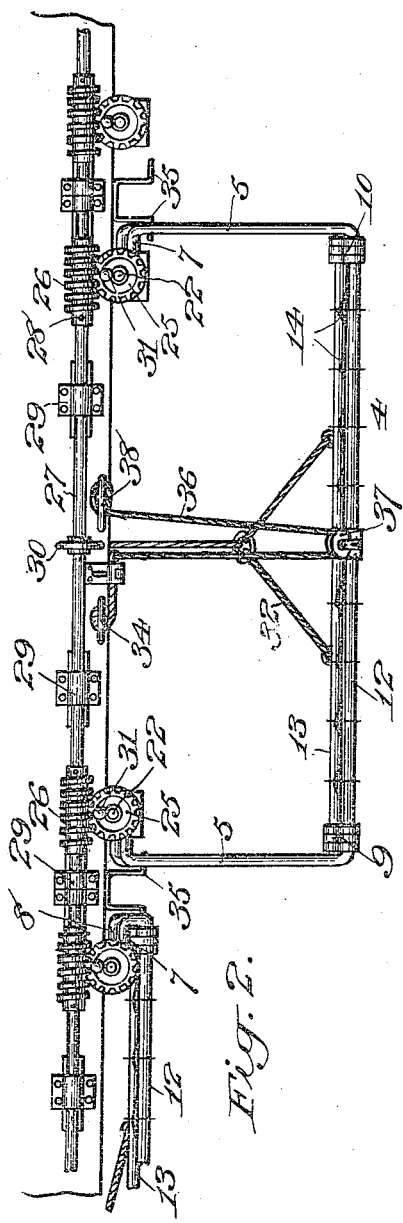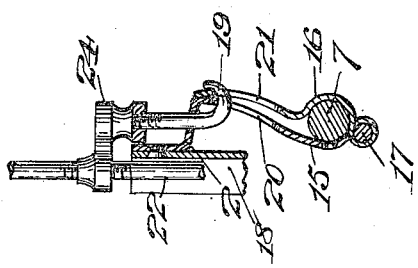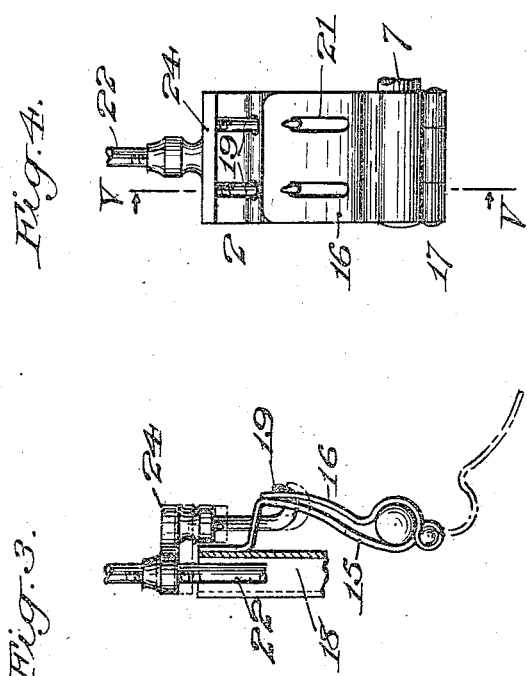

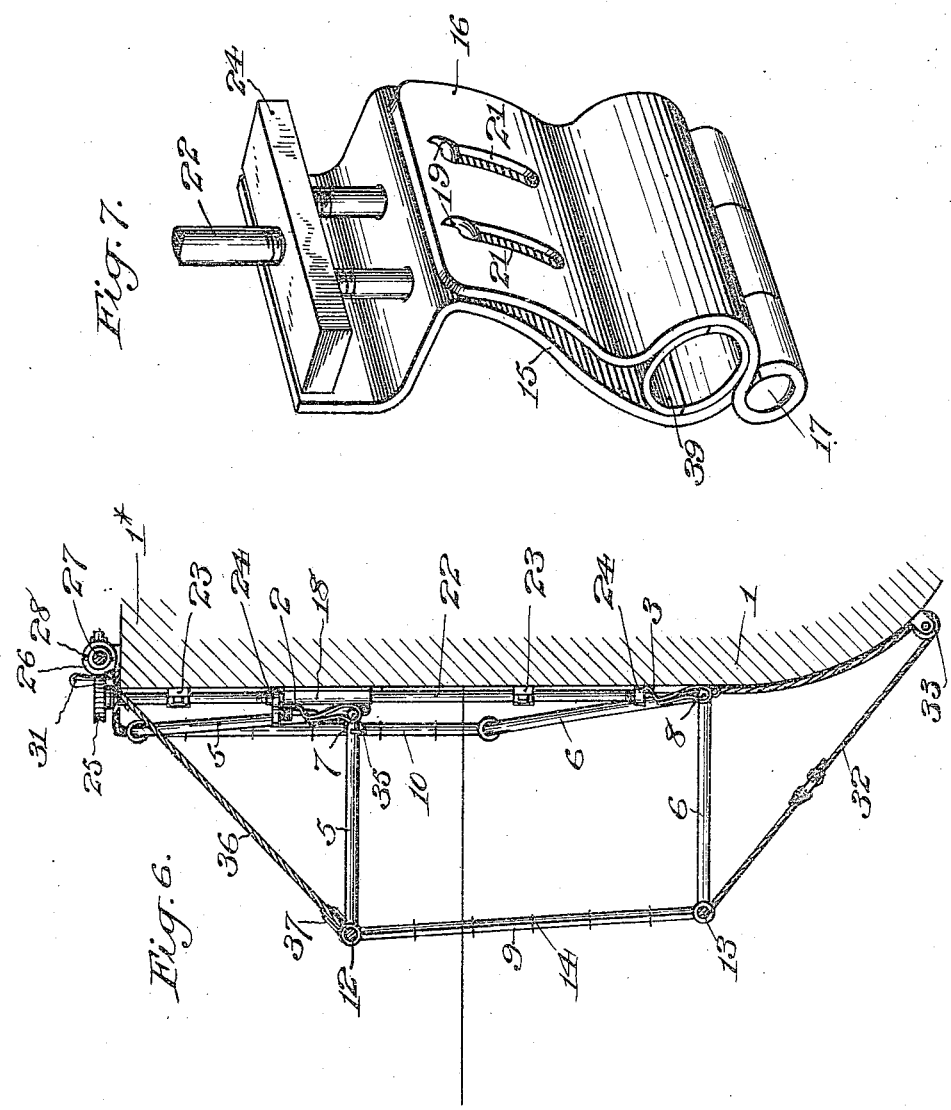

MANUEL SILVA PEREIRA AND CUSTODIO SILVA, OF BROOKLYN, NEW YORK.

PROTECTOR FOR VESSELS.

1,259,440. Specification of Letters Patent. Patented Mar. 12, 1918.

Application filed November 30, 1917. Serial No. 204,649.

*To all whom it may concern:*

Be it known that we, MANUEL SILVA PEREIRA and CUSTODIO SILVA, subjects of the King of Spain, and residents of the borough of Brooklyn, in the city and State of New York, have invented a new and useful Improvement in Protectors for Vessels, of which the following is a specification.

This invention relates to protectors for vessels and more particularly to torpedo protectors, with the object in view of providing a series of substantially rigid net carrying frames extending lengthwise of the vessel arranged to be moved vertically toward and away from the longitudinal axis of the vessel and means supporting the frames laterally in spaced relation therewith to form an effective shield for the vessel; bearings being provided for the net carrying frames which may be readily and independently manipulated to quickly and bodily release the frames as necessity requires.

It is intended that the net carrying frames shall be maintained approximately parallel to the longitudinal axis of the vessel in their operative positions so as to present the minimum amount of resistance to the progress of the ship.

A practical embodiment of our invention is represented in the accompanying drawings, in which—

Figure 1 represents in side elevation a portion of the side of a vessel having one of our improvd protectors and the adjacent mechanism applied thereto in an operative position, a portion of another raised out of position, and a portion of the adjacent mechanism that remains on the side of the vessel after the frame has been removed, Fig. 2 represents a plan view of the same, Fig. 3 represents a detail side elevation, on an enlarged scale, of one of the bearings which supports the frames, Fig. 4 represents a front elevation of the same, Fig. 5 represents a vertical central section taken in the plane of the line V—V of Fig. 4, Fig. 6 represents a vertical section taken in the plane of the line VI—VI of Fig. 1, looking in the direction of the arrows, and Fig. 7 represents a perspective view of one of the bearings having a bushing applied thereto.

The hull of the vessel, denoted by 1, has, secured to its vertical sides, bearings, which are arranged in pairs, the upper pair being denoted by 2 and the lower pair by 3.

A series of frames 4 each preferably rectangular in form, of a width and length sufficient to be conveniently manipulated, are arranged to be moved vertically toward and away from the side of the hull by means of arms 5, 6, the outer ends of which arms are pivotally connected to the frame 4 and the inner ends 7, 8, turned inwardly and journaled in the bearings 2, 3.

Each of the frames 4 comprises vertical end bars 9, 10, and an intermediate bar 11, all of which bars are connected at their ends to horizontal bars 12, 13. A wire fabric or other suitable net 14 is stretched between and secured to the vertical and horizontal bars to form a shield for the sides of the vessel.

In order to quickly remove the frames 4 from the vessel, for the purposes of repair or in the event the net has caught an object which would be dangerous to the vessel if retained therein and which frame must be instantly liberated and dropped into the sea, the bearings 2, 3, are each formed of two members, a fixed member 15 and a movable member 16, which movable member is hinged to the fixed member at 17. The fixed member 15 of each bearing 2 is secured to a bracket 18 fixed to the hull 1, while the fixed member of the bearing 3 is secured to the hull itself. The movable member 16 is held in engagement with its member 15 by means of one or more hooks 19 which are adapted to be moved vertically in slots 20, 21, in the members 15, 16, respectively, and engage the member 16 at the top of the slot 21. The hooks 19 are moved simultaneously in each pair of bearings 2, 3, by means of vertical shafts 22 journaled in supports 23 fixed on the side of the vessel and having a screw threaded engagement with blocks 24 in which the hooks 19 are supported.

Thus it will be seen that by rotating the shafts in one direction the blocks 24 will be screwed upwardly thereon, drawing the hooks 19 upwardly in the slots until they engage the top of the slot 21 in the member 16. In rotating the shafts in the opposite direction the blocks and hooks will be caused to travel downwardly to a position where the member 16 will be free to pass the hooks. The construction of the member 16 is such that it will fall by gravity to the position shown in dotted lines in Fig. 3 in which position the ends 7, 8, of the arms 5, 6, are free to fall from the bearings.

The upper ends of the vertical shaft are each provided with a worm wheel 25 which meshes with a worm 26 secured to a horizontal shaft 27 by means of pins 28.

The shaft 27 is journaled in supports 29 mounted on the gunwale 1* of the vessel and may be a continuous shaft, rotated by power (not shown) or, as shown in the several figures, the shaft may be sectional and operated by a hand wheel 30, each section of the shaft having a pair of worms which coact with their respective worm wheels and shafts so that all of the bearings carrying one frame may be manipulated to release their frame simultaneously. Each pair of bearings 2, 3, may also be manipulated simultaneously by removing the pins 28, leaving the worms free on the shaft and permitting the worm wheels to be rotated by means of handles 31 carried thereby, in which manner one side of the frame will be released at a time.

The frames 4 are swung outwardly to their operative position by means of a flexible connection 32, such as a wire cable or rope, which is secured to the horizontal bar 13 and carried downwardly around a pulley 33 fast on the side of the vessel and thence upwardly to a cleat 34 where it is drawn tight and fastened. The frames are supported in their operative position by means of brackets 35 secured to the side of the vessel in which the arms 5 rest, as clearly shown in Figs. 1, 2 and 6. Each frame 4 is drawn upwardly to the side of the vessel from its operative position by a wire cable or rope 36, one end of which is connected to the side of the vessel and passed downwardly around a pulley 37 carried by the horizontal bar 12, thence upwardly to a cleat 38 fixed on the gunwale 1*. When the frames are in their operative position, as shown in Figs. 1, 2 and 6, the cable 32 assists in holding the arms 5 in their brackets and resists any unintentional upward movement of the frame. After the cable 32 is secured to its cleat, the cable 36 may then be drawn taut and fastened to its cleat 38, thereby relieving the brackets 35 of any undue downward movement of the frame. It will also be seen that the cable 36 will assist in supporting the weight of the center of the frame especially where the frames are of considerable length.

In the form shown in Fig. 7, we have provided the bearing with a divided bushing 39 which is retained in position by the movable member and hooks.

It is evident that slight changes may be resorted to in the form, construction and arrangement of the several parts without departing from the spirit and scope of our invention; hence we do not wish to limit ourselves strictly to the structure herein set forth, but

What we claim is:—

1. A protector for vessels comprising a series of net carrying frames, each frame having pairs of upper and lower arms pivoted thereon, bearings secured to the side of the vessel and adapted to receive said arms, means for moving said frames toward and away from the vessel and means for simultaneously releasing the arms of each pair from the bearings.

2. A protector for vessels comprising a series of net carrying frames having arms pivoted thereon, bearings secured to the side of the vessel and adapted to receive said arms, means for moving said frames toward and away from the vessel and means for simultaneously releasing the arms from the bearings.

3. A protector for vessels comprising a series of net carrying frames having arms pivoted thereon and bearings secured to the side of the vessel and adapted to receive said arms, each of said bearings comprising a fixed member, a movable member and means for locking and releasing said members.

4. A protector for vessels comprising a series of net carrying frames having arms pivoted thereon and bearings secured to the side of the vessel and adapted to receive said arms, each of said bearings comprising a fixed member, a movable member and means for engaging said movable member for locking the members together.

5. A protector for vessels comprising a series of net carrying frames having arms pivoted thereon and bearings secured to the side of the vessel and adapted to receive said arms, each of said bearings comprising a fixed member, a movable member and a vertically movable means for engaging said movable member for locking the members together.

6. A protector for vessels comprising a series of net carrying frames having arms pivoted thereon and bearings secured to the side of the vessel and adapted to receive said arms, each of said bearings comprising a fixed member, a movable member and hooks arranged to engage said movable member for locking the members together.

7. A protector for vessels comprising a series of net carrying frames having arms pivoted thereon and bearings secured to the side of the vessel and adapted to receive said arms, each of said bearings comprising a fixed member, a movable member and vertically movable hooks arranged to engage said movable member for locking the members together.

8. A protector for vessels comprising a series of net carrying frames having arms pivoted thereon and bearings secured to the side of the vessel and adapted to receive said arms, each of said bearings comprising a fixed member having slots therein, a movable member having slots in register with the aforesaid slots, and a block provided with hooks arranged to enter said slots and engage said movable member for locking the members together.

9. A protector for vessels comprising a series of net carrying frames having arms pivoted thereon and bearings secured to the side of the vessel and adapted to receive said arms, each of said bearings comprising a fixed member having slots therein, a movable member having slots in register with the aforesaid slots, and a vertically movable block provided with hooks arranged to enter said slots and engage said movable member for locking the members together.

10. A protector for vessels comprising a series of net carrying frames having arms pivoted thereon and bearings secured to the side of the vessel and adapted to receive said arms, each of said bearings comprising a fixed member having slots therein, a movable member having slots in register with the aforesaid slots, a shaft mounted to rotate on the side of the vessel, a block having a screw threaded engagement with said shaft, said block being provided with hooks arranged to enter said slots and engage said movable member, and means for rotating the shaft to vertically move the block for locking and releasing the members.

In testimony, that we claim the foregoing as our invention, we have signed our names this 23rd day of November, 1917.

MANUEL SILVA PEREIRA.
CUSTODIO SILVA.

Copies of this patent may be obtained for five cents each, by addressing the "Commissioner of Patents, Washington, D. C."